United States Patent [19]

Bonnet

[11] Patent Number: 5,509,526
[45] Date of Patent: Apr. 23, 1996

[54] DUAL LEVEL TILTING TRAY PACKAGE SORTING APPARATUS

[75] Inventor: Henri Bonnet, Atlanta, Ga.

[73] Assignee: United Parcel Service of America, Inc., Atlanta, Ga.

[21] Appl. No.: 396,973

[22] Filed: Mar. 1, 1995

Related U.S. Application Data

[62] Division of Ser. No. 154,207, Nov. 17, 1993, Pat. No. 5,433,311.

[51] Int. Cl.⁶ .................................................. B65G 17/06
[52] U.S. Cl. .................................................. 198/850
[58] Field of Search .................................................. 198/850

[56] References Cited

U.S. PATENT DOCUMENTS

| | | | |
|---|---|---|---|
| 3,262,549 | 7/1966 | Stewart et al. | 198/850 X |
| 3,349,893 | 10/1967 | Jordan et al. | 198/850 X |
| 3,757,942 | 9/1973 | Gunn. | |
| 3,904,028 | 9/1975 | Muller | 198/850 |
| 3,955,678 | 5/1976 | Moyer. | |
| 3,977,513 | 8/1976 | Rushforth. | |
| 4,031,998 | 6/1977 | Suzuki. | |
| 4,089,404 | 5/1978 | Venzke. | |
| 4,399,904 | 8/1983 | Canziani. | |
| 4,537,658 | 8/1985 | Albert | 198/850 X |
| 4,682,686 | 7/1987 | Ueda et al. | 198/850 |
| 4,712,965 | 12/1987 | Canziani. | |
| 4,722,430 | 2/1988 | Canziani. | |
| 4,744,454 | 5/1988 | Polling. | |
| 4,838,435 | 6/1989 | Alexandre. | |
| 4,846,335 | 7/1989 | Hartlepp. | |
| 4,856,642 | 8/1989 | Nicholson. | |
| 4,982,828 | 1/1991 | Nicholson. | |
| 5,018,928 | 5/1991 | Hartlepp. | |
| 5,054,601 | 10/1991 | Sjogren. | |
| 5,086,905 | 2/1992 | Polling. | |
| 5,090,552 | 2/1992 | Fukuyama. | |
| 5,181,597 | 1/1993 | Geerts. | |
| 5,307,921 | 5/1994 | Richardson. | |

FOREIGN PATENT DOCUMENTS

| | | | |
|---|---|---|---|
| 0352226 | 4/1922 | Germany | 198/850 |
| 2460296 | 7/1975 | Germany. | |
| 8714976 U | 2/1988 | Germany. | |
| 4104341 | 9/1991 | Germany. | |
| 0138010 | 5/1990 | Japan. | |
| 0221007 | 9/1990 | Japan | 198/850 |
| 0395009 | 4/1991 | Japan | 198/850 |
| 1045348 | 10/1966 | United Kingdom | 198/850 |
| 2002314 | 2/1979 | United Kingdom. | |
| 2073691 | 10/1981 | United Kingdom. | |
| 2184416 | 6/1987 | United Kingdom. | |
| 2197633 | 5/1988 | United Kingdom. | |

*Primary Examiner*—James R. Bidwell
*Attorney, Agent, or Firm*—Jones & Askew

[57] ABSTRACT

An automatic system for sorting items, such as small parcels, into groups bound for different geographical locations is described. The system uses tilting trays arranged at multiple levels, with all the trays being mounted on carriages traveling on a single monorail. The trays are tilted at the proper output chutes by cam roller mechanisms which are appropriately inserted into the path of cams on the trays under the coordination of a digital controller. A simple drive mechanism moves the carriages along the monorail using a drive roller which presses against the carriages. The carriages may be linked by a pliable linkage assembly that does not include mechanical hinges or like mechanisms. The system is easy to repair and operates at low noise levels.

10 Claims, 11 Drawing Sheets

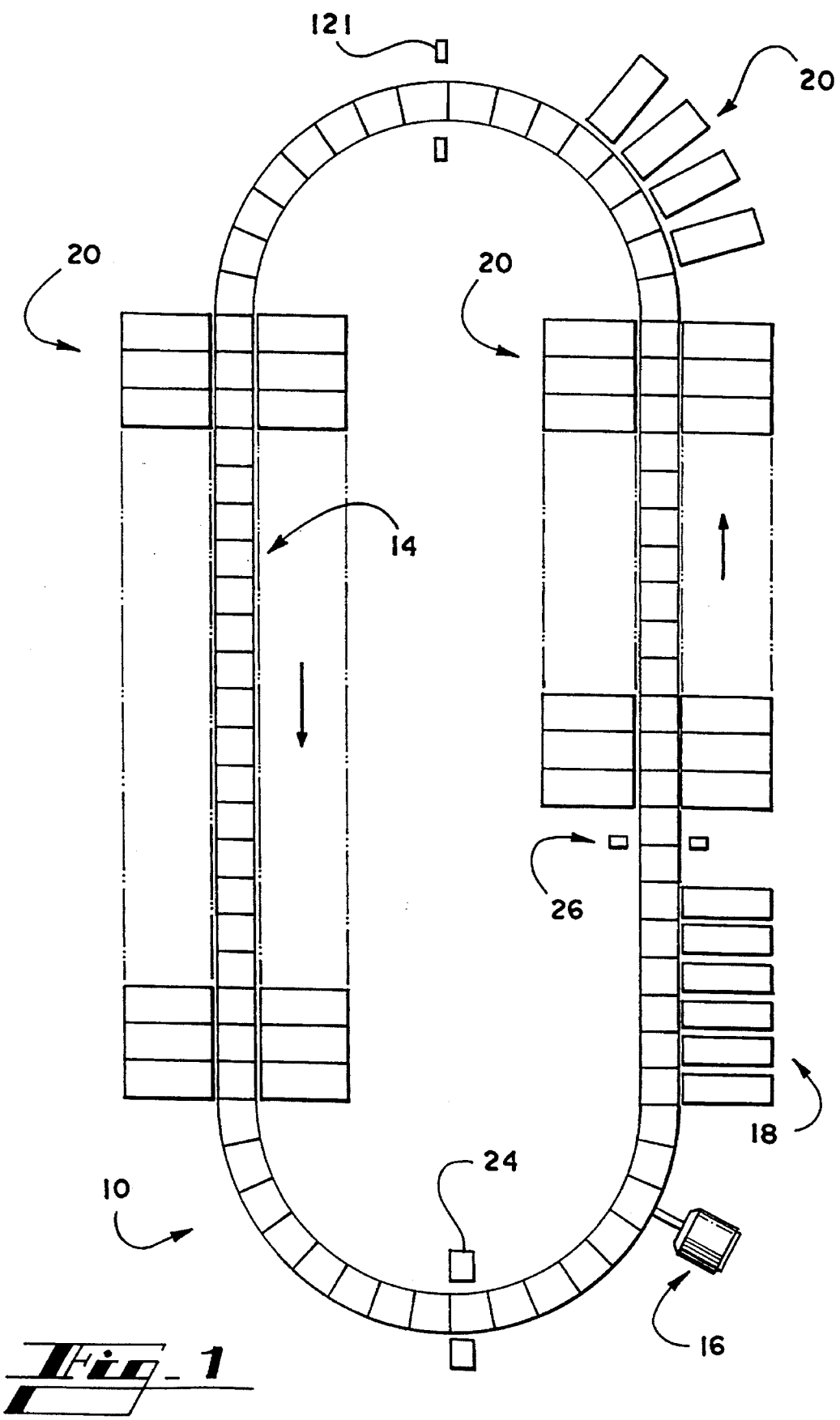
Fig_1

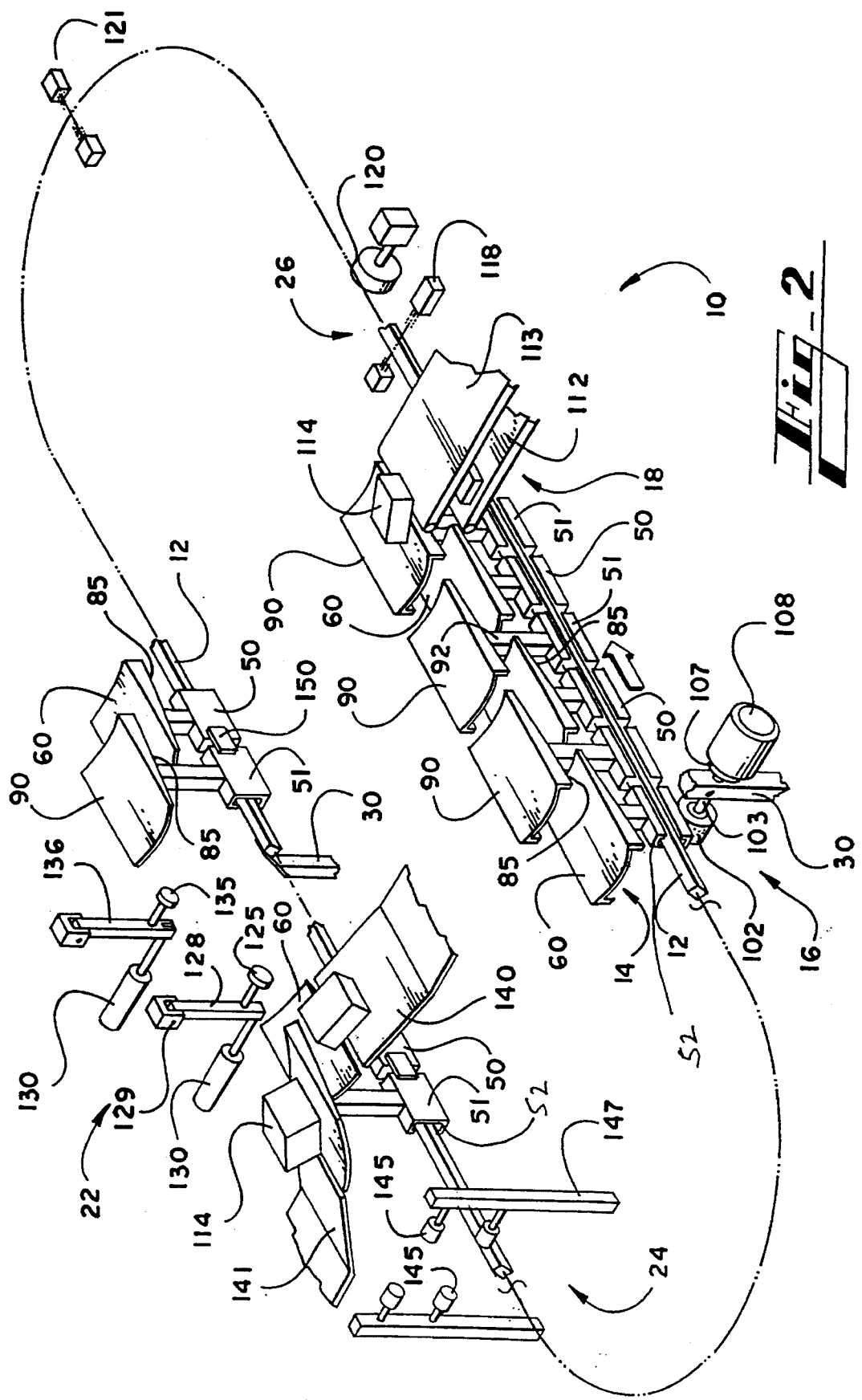

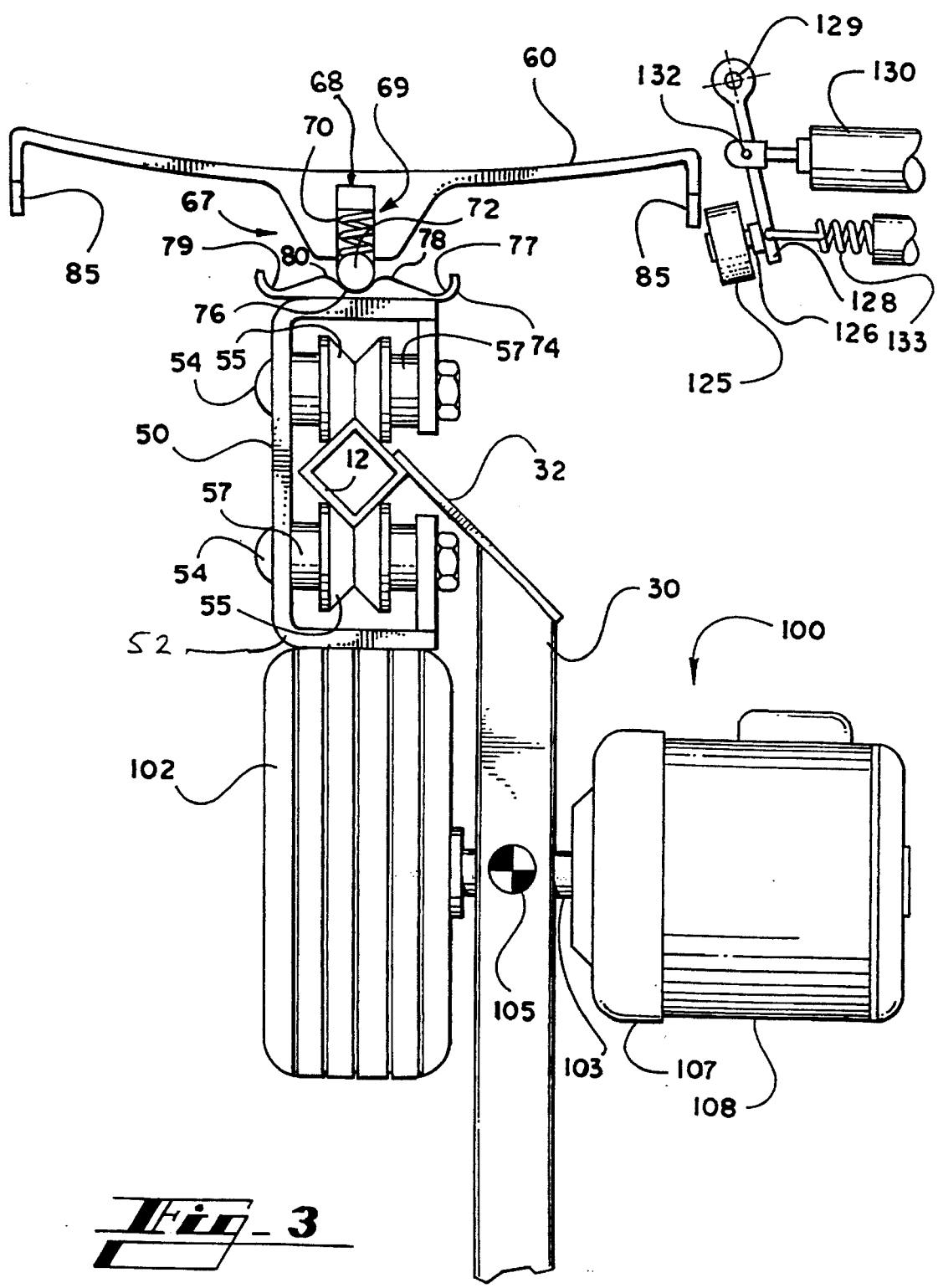
Fig_3

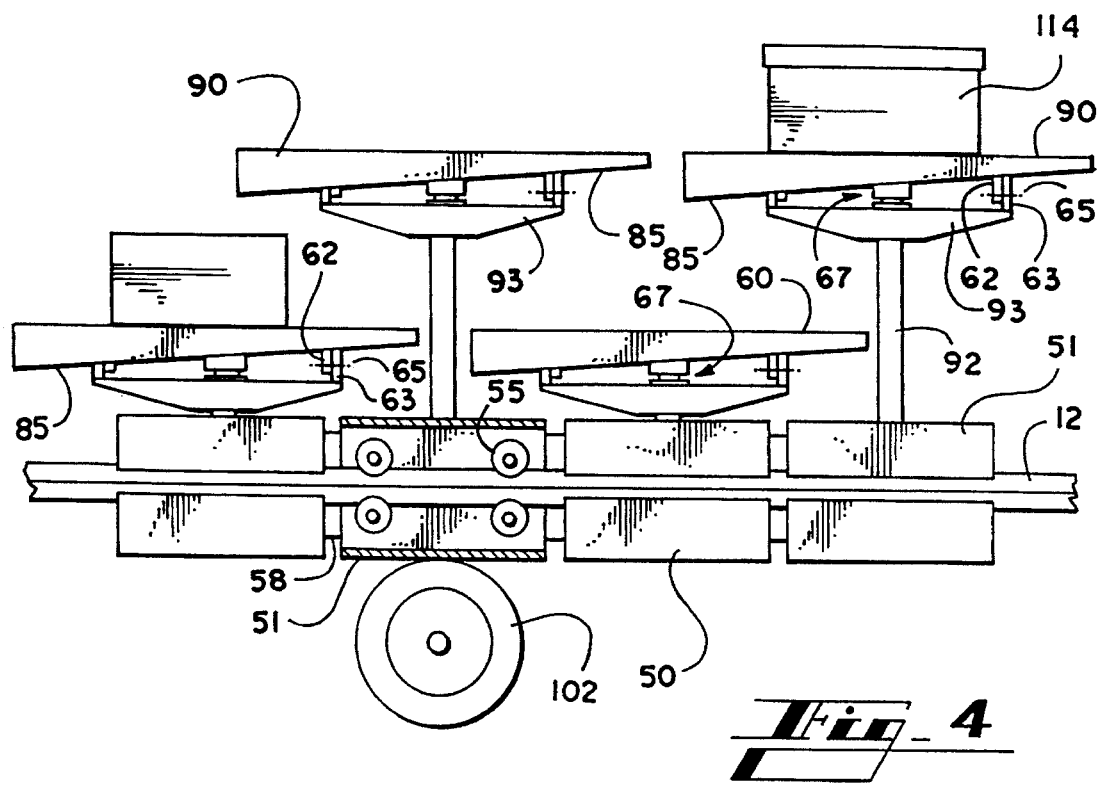
Fig_4
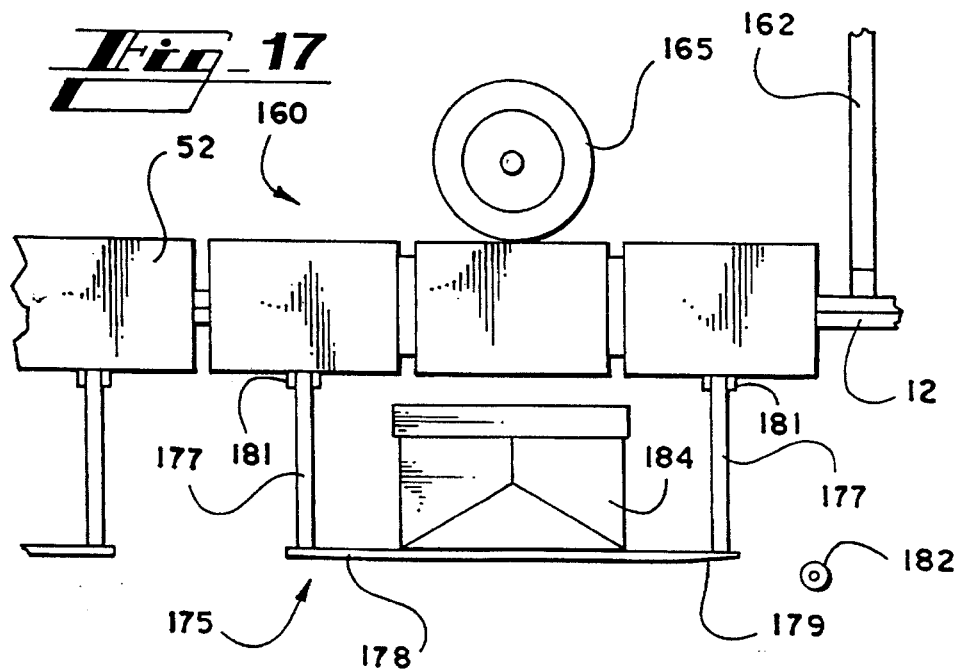
Fig_17

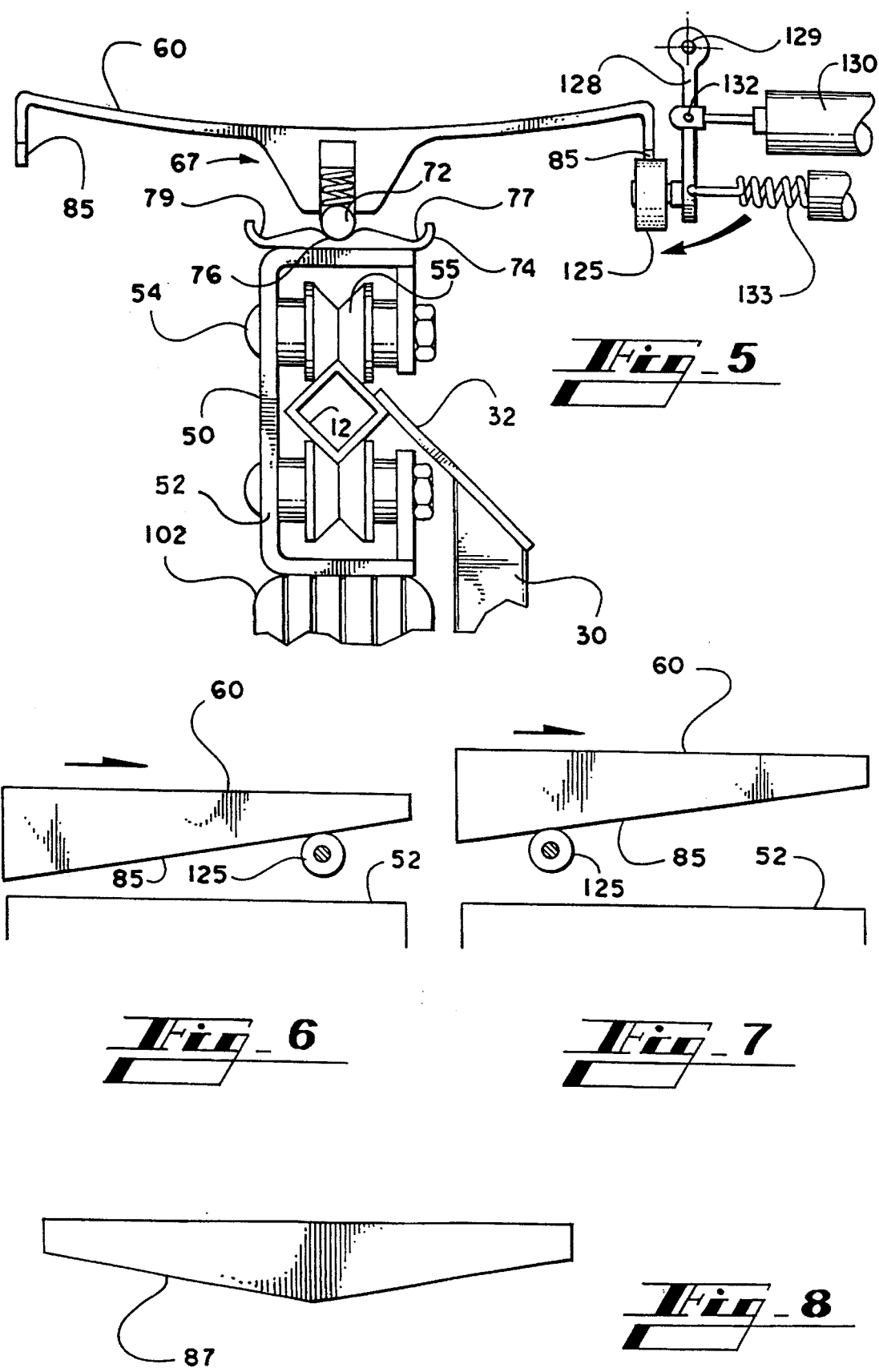

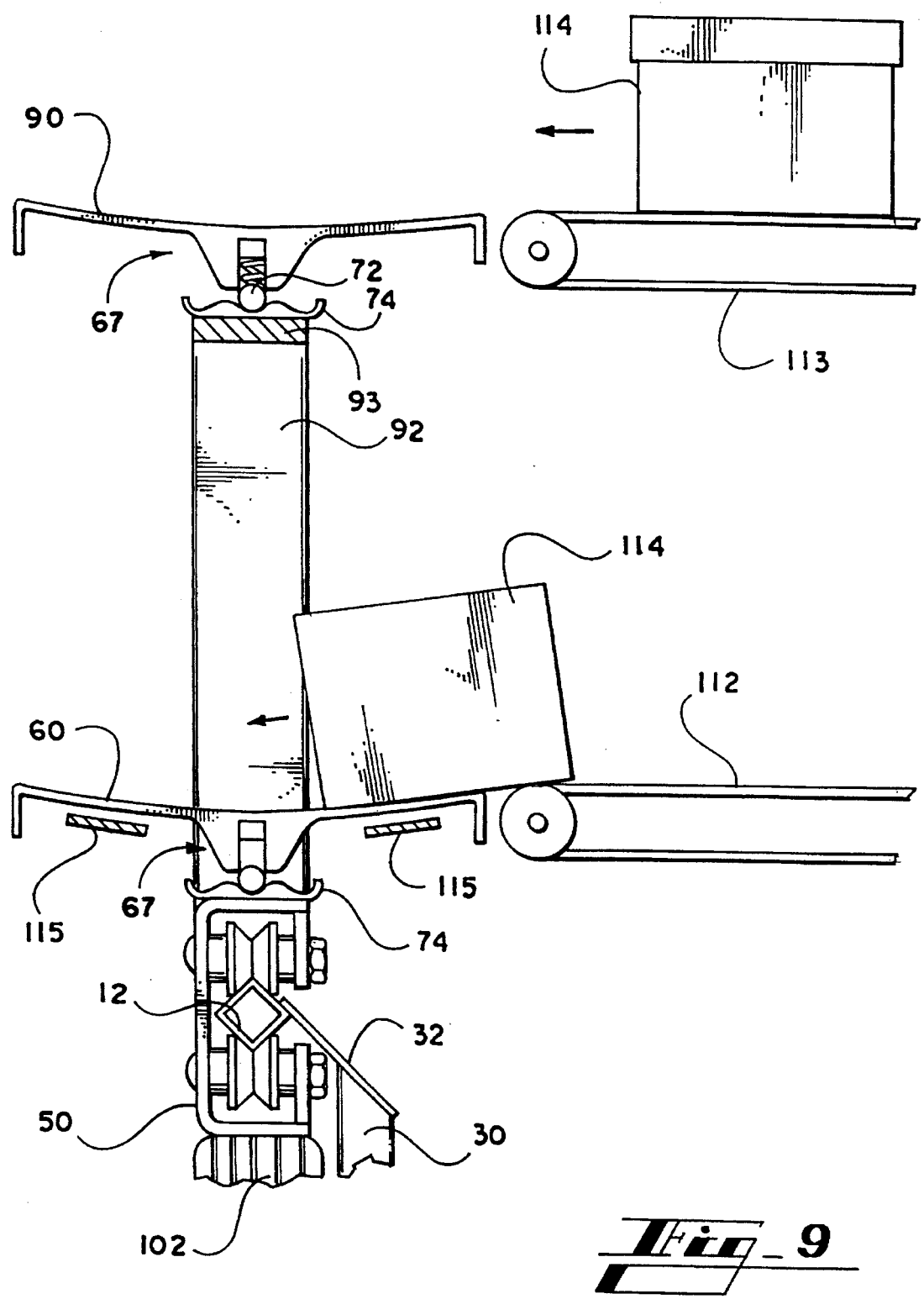

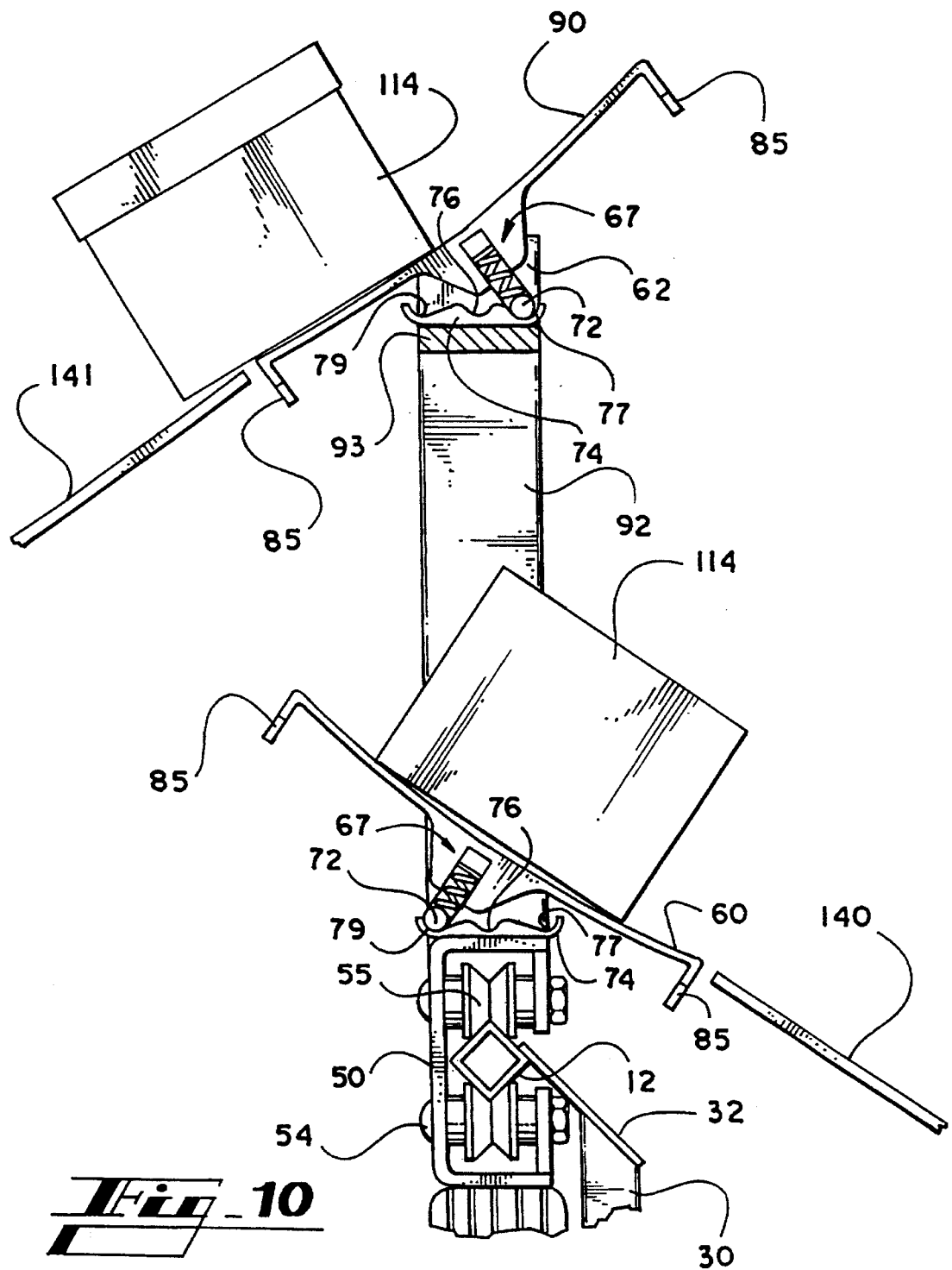

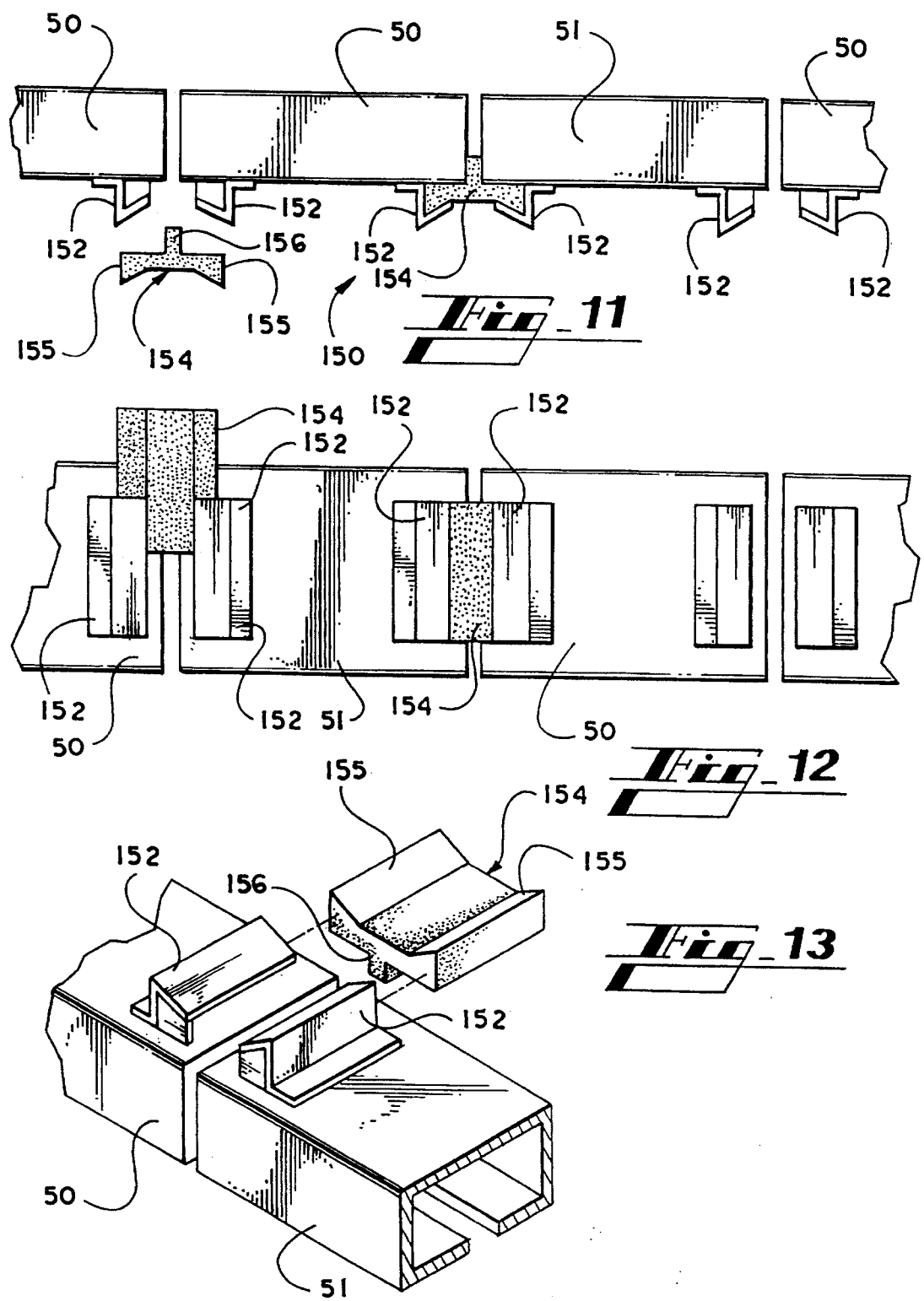

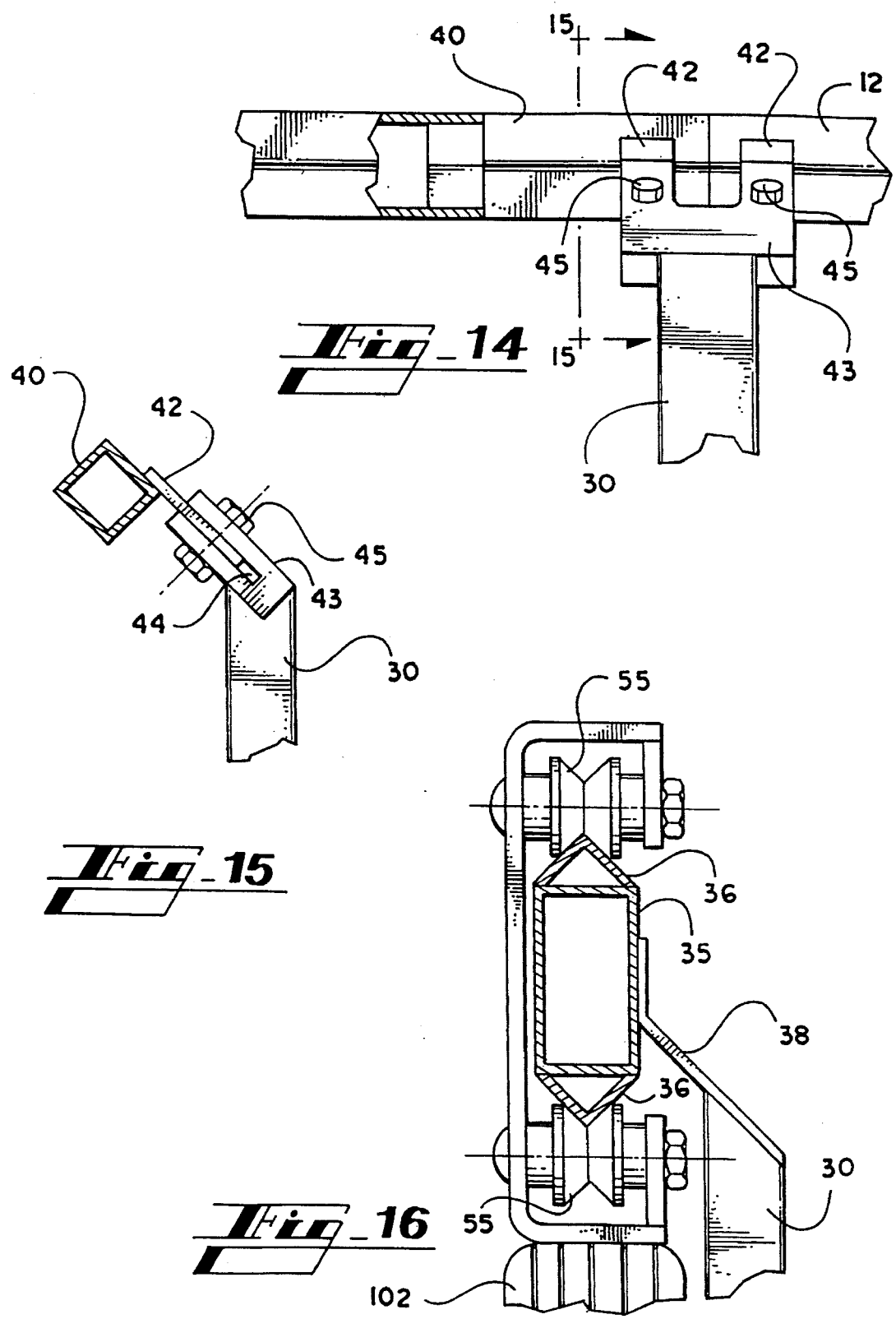

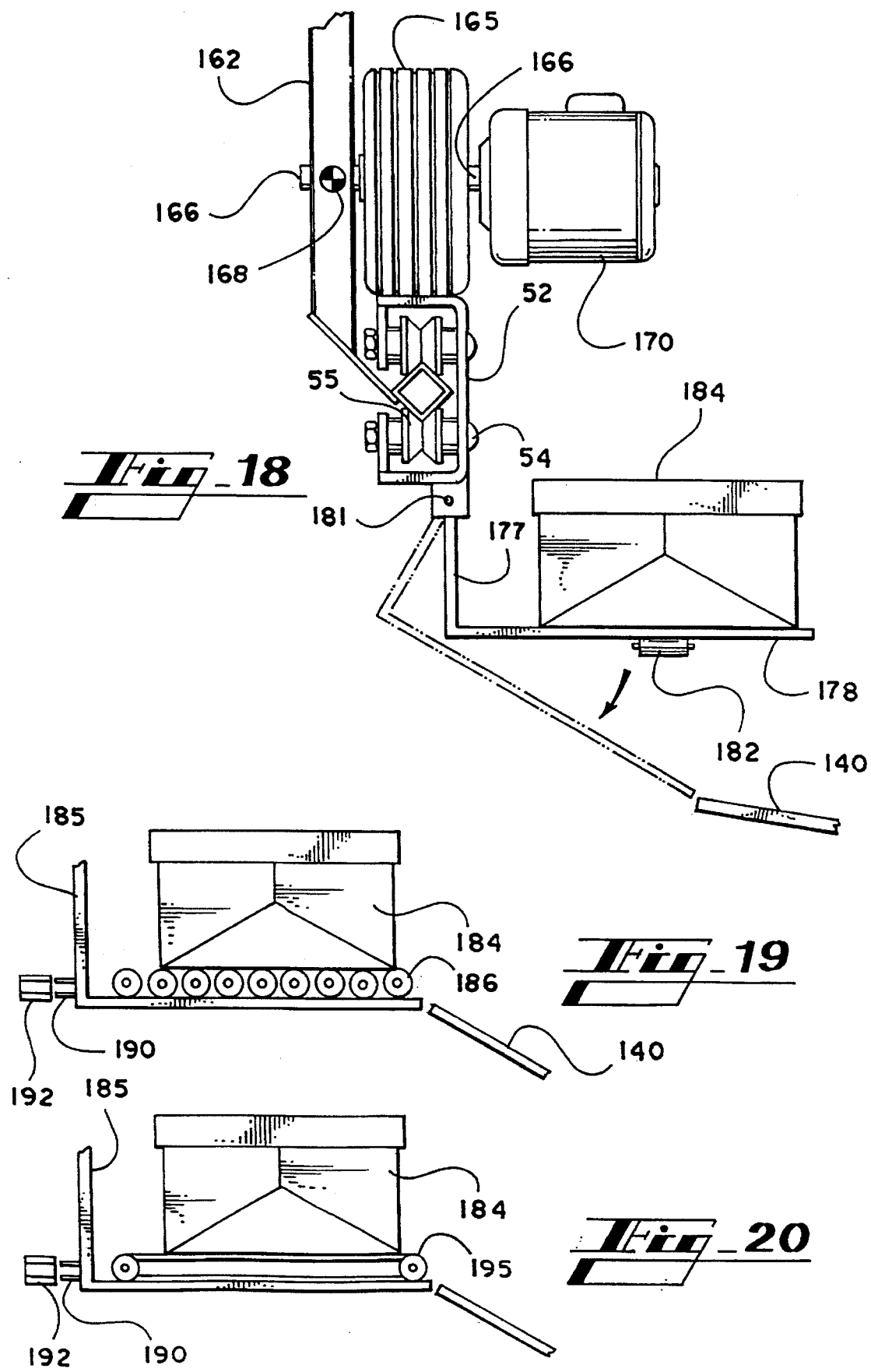

DUAL LEVEL TILTING TRAY PACKAGE SORTING APPARATUS

This is a division of application Ser. No. 08/154,207, filed Nov. 17, 1993, U.S. Pat. No. 5,433,311.

TECHNICAL FIELD

The present invention relates to automatic sorting of items such as small packages into groups bound for different geographical locations, and more particularly relates to an automatic sorting apparatus using tilting trays which receive items from input conveyors and deposit them into designated output chutes or bins under programmed control.

BACKGROUND ART

Tilt tray sorters have been available for many years. Such systems are useful in sorting small packages for delivery to different regions, such as zip code areas. Under control of a computer or programmed logic controller, packages may be identified or coded as they enter the system, and then tracked for output at a chute or bin corresponding to the coded destination.

It is known to form a loop of linked carriages running along a loop of track. A human operator or automatic equipment loads items onto trays mounted on the carriages at one point around the loop, and the system automatically tilts the trays at various output locations adjacent to the track to discharge the packages. Many such systems drive the linked carriages by means of a chain or belt drive, which tends to be expensive and noisy. Such systems also occupy a large amount of space, and include complex mechanisms that are relatively difficult to repair.

At a package delivery company, the amount of time a sorter is shut down for repairs has a significant negative effect on the company's ability to meet delivery deadlines. Thus, reliability is a major goal in designing sorting systems. By simplifying mechanical assemblies and providing for easy substitution of failed parts, reliability can be increased and down time reduced. Furthermore, such companies must take steps to reduce noise levels in their facilities as governmental regulations concerning noise become more strict; thus, lowering noise levels in sorting systems is also a major goal.

The sorting system disclosed in U.S. Pat. No. 4,712,965 drives linked carriages around a dual rail track by means of one or more drive carriages. The drive carriages contain motors which derive power for operation from sliding contacts. The motors drive rollers which are pressed against a third rail by the weight of the motor. The carriages are separated by bumpers, and unloading is accomplished by driven conveyor belts mounted on the carriages, rather than by tilting trays.

Another system of looped carriages, but including a tilting tray mechanism, is disclosed in U.S. Pat. No. 5,054,601, which is incorporated herein by reference. The carriages are driven by induction motors positioned beneath the path of the carriages. A conveyor and overhead loader mechanism automatically load the carriages and shaft encoders monitor the speed of the carriages along the looped track. Rollers mounted on the carriages interact with cams provided along the track to unload the trays at their predetermined destination. The loading and unloading functions are under computer control. A latch mechanism holds the trays in a tilted position until they are straightened by a return mechanism.

In those prior art systems which drive a series of carriages by means of a chain or belt positively connected to the carriages, there is no need to link the carriages. In fact they may be spaced apart along the chain to avoid interaction. However, in some prior systems in which the train of carriages has been pulled by a locomotive carriage or by induction, the carriages must be linked. The linkage between carriages is a source of wear and noise. Therefore, a mechanical joint consisting of multiple interacting metal or plastic parts must be designed to reduce friction and possibly lubricated. Even then, the wear and noise problems associated with each linkage can only be alleviated, not eliminated.

Tilting tray sorting systems are also shown in U.S. Pat. Nos. 4,089,404; 5,018,928; and 4,982,828. The latter patent discloses a mechanism which tilts the trays by moving rollers mounted along the track into the path of cam surfaces on the edges of the trays.

Another problem which arises in the field of automatic sorting is how to handle and sort large, irregularly shaped items. The prior systems noted above generally are unable to handle such irregular items.

As may be seen from the foregoing, prior sorting systems are complex both mechanically and electrically, require a relatively large amount of floor space for the volume of items that can be sorted, require significant maintenance, and by their nature are noisy. There has been a need in the art for a sorting system that is simple in construction, is easy to maintain and keep on line, provides a high throughput of sorted items per occupied floor space, and operates at low noise levels.

SUMMARY OF THE INVENTION

The present invention provides an improved sorting system which uses a simple, inexpensive construction, may be easily maintained by substitution of components, increases throughput by providing a double tier of tiltable trays, employs a unique drive mechanism, and decreases noise levels by employing a flexing linkage with no moving parts between carriages and by employing a low-noise drive mechanism. These features individually and in combination are aspects of the present invention.

Generally described, one aspect of the invention provides an apparatus for transporting objects, comprising a track, a plurality of carriages each including a carriage body mounted for movement along the track, at least one of the carriages including an upper object-holding platform spaced above the body, and at least one of the carriages including a lower object-holding platform positioned below the level of the upper platform, and a drive mechanism operable to cause the carriages to move along the track. Preferably, one of the carriages is an upper level carriage including only an upper object-holding platform, and at least one of the carriages is a lower level carriage including only a lower object-holding platform positioned below the level of the upper platform. In this preferred arrangement, the carriages are arranged to alternate upper and lower level carriages, and the upper platforms extend at least partly over the lower platforms of adjacent lower level carriages.

The carriages may be positioned to occupy all of a closed loop without any linkage between carriages, or, if desired, they may be linked together.

Another aspect of the present invention provides an apparatus for transporting and sorting objects, each to one of a plurality of output locations, comprising a track, a plurality of carriages mounted adjacent to one another for movement along the track, a drive mechanism including a drive roller mounted adjacent to the track to frictionally engage the carriages in sequence and a source of rotational force mounted to rotate the drive roller so as to cause the carriages to move along the track, a transfer mechanism operative to unload an object from the carriages, at least one sensor located to monitor the position of each of the carriages along the track, and a programmed controller configured to operate the transfer mechanism responsive to the sensor to unload a carriage carrying an object when the carriage reaches a predetermined output location along the track. Optionally, the drive mechanism comprises two or more of the drive rollers spaced apart from one another. The source of rotational force may comprise a motor connected to the drive roller by a drive shaft pivotally mounted about an axis located intermediate the drive roller and the motor, with the drive roller and the motor being movable with the drive shaft such that the weight of the motor urges the drive roller against the carriages.

Another aspect of the present invention provides an apparatus for transporting objects, comprising a track, a plurality of carriages mounted for movement along the track, a drive mechanism operable to cause the carriages to move along the track, and a linkage connecting adjacent carriages, the linkage comprising a bracket attached to each of the adjacent carriages, shaped to define a pocket, and a link member defining a pair of ends positioned in the pockets. The brackets are preferably positioned on side surfaces of the carriages, with the pockets opening to face an adjacent carriage. Furthermore, the link member may be made of pliable material and may include a cushioning member extending between end surfaces of the carriages.

In the foregoing aspects of the present invention, an object holding platform associated with the carriages may be provided with a cam surface, and a transfer mechanism comprising a cam follower may be selectively positionable in the path of the cam surface.

Another aspect of the present invention provides an apparatus for transporting objects, comprising a track, a plurality of carriages mounted for movement along the track, a drive mechanism operable to move a line of the carriages along the track, and an object-holding platform suspended below at least two of the carriages and movable with the line of carriages. A transfer mechanism operable to remove an object from the platform may be provided and may include a conveyor or means for selectively tilting the platform.

Thus, it is an object of the present invention to provide an improved automated sorting system.

It is a further object of the present invention to provide a sorting system for small items or packages which sorts such items at a high rate per floor area occupied by the system.

It is a further object of the present invention to provide a transportation system of the type including a line of carriages, having an uncomplicated drive system which requires neither a drive chain or belt nor a propulsion mechanism mounted on board any carriage.

It is a further object of the present invention to provide a transportation system of the type including carriages linked to one another in a way which both cushions the carriages from one another and permits relative movement without a multi-part joint.

It is a further object of the present invention to provide an automated transportation system which operates at a low noise level.

It is a further object of the present invention to provide an automated transportation system that can be repaired by replacing inexpensive sub-assemblies.

It is a further object of the present invention to provide an automated sorting system that is suitable for carrying and sorting large, irregular items.

Other objects, features, and advantages of the present invention will become apparent upon review of the following description of preferred embodiments and the appended drawing and claims.

BRIEF DESCRIPTION OF THE DRAWING

FIG. 1 is a diagrammatic top plan view of a sorting system embodying the invention.

FIG. 2 is a pictorial view of the sorting system of Claim 1, with parts removed to show detail.

FIG. 3 is a end view of a carriage of the sorting system of Claim 1, also showing the tilting actuator and drive mechanism.

FIG. 4 is a outer side elevation view of a section of the sorting system of Claim 1, with parts broken away to show interior detail.

FIG. 5 is a end elevation view of a carriage with the tilting actuator positioned to tilt the tray.

FIG. 6 is a diagrammatic view of a cam surface of a tray interacting with a cam follower of the tilting mechanism.

FIG. 7 is a diagrammatic view of a cam surface of a tray interacting with a cam follower of the tilting mechanism at a time subsequent to that shown in FIG. 6.

FIG. 8 is a diagrammatic view of an alternate embodiment of a tray cam surface for use with carriages that can travel in reverse.

FIG. 9 is a end elevation view of a pair of adjacent carriages (upper and lower) aligned with input conveyors.

FIG. 10 is a end elevation view of a pair of adjacent carriages (upper and lower), the trays of which have been tilted for depositing parcels onto output conveyors.

FIG. 11 is a diagrammatic top plan view of adjacent carriages linked by flexible bumpers.

FIG. 12 is side view of the carriages of FIG. 11.

FIG. 13 is a pictorial view of a flexible bumper being inserted into brackets mounted on adjacent carriages.

FIG. 14 is a side view of a removable rail section.

FIG. 15 is an end view of the attachment of the removable section of FIG. 14 to a post.

FIG. 16 is an end elevation view of an alternate rail construction.

FIG. 17 is a diagrammatic side view of a second embodiment of a sorting system utilizing suspended platforms.

FIG. 18 is an end sectional view of the sorting system of FIG. 17.

FIG. 19 is an end view of a suspended platform including motorized rollers for unloading items.

FIG. 20 is an end view of a suspended platform including a motorized conveyor for unloading items.

DETAILED DESCRIPTION

Figure 21:
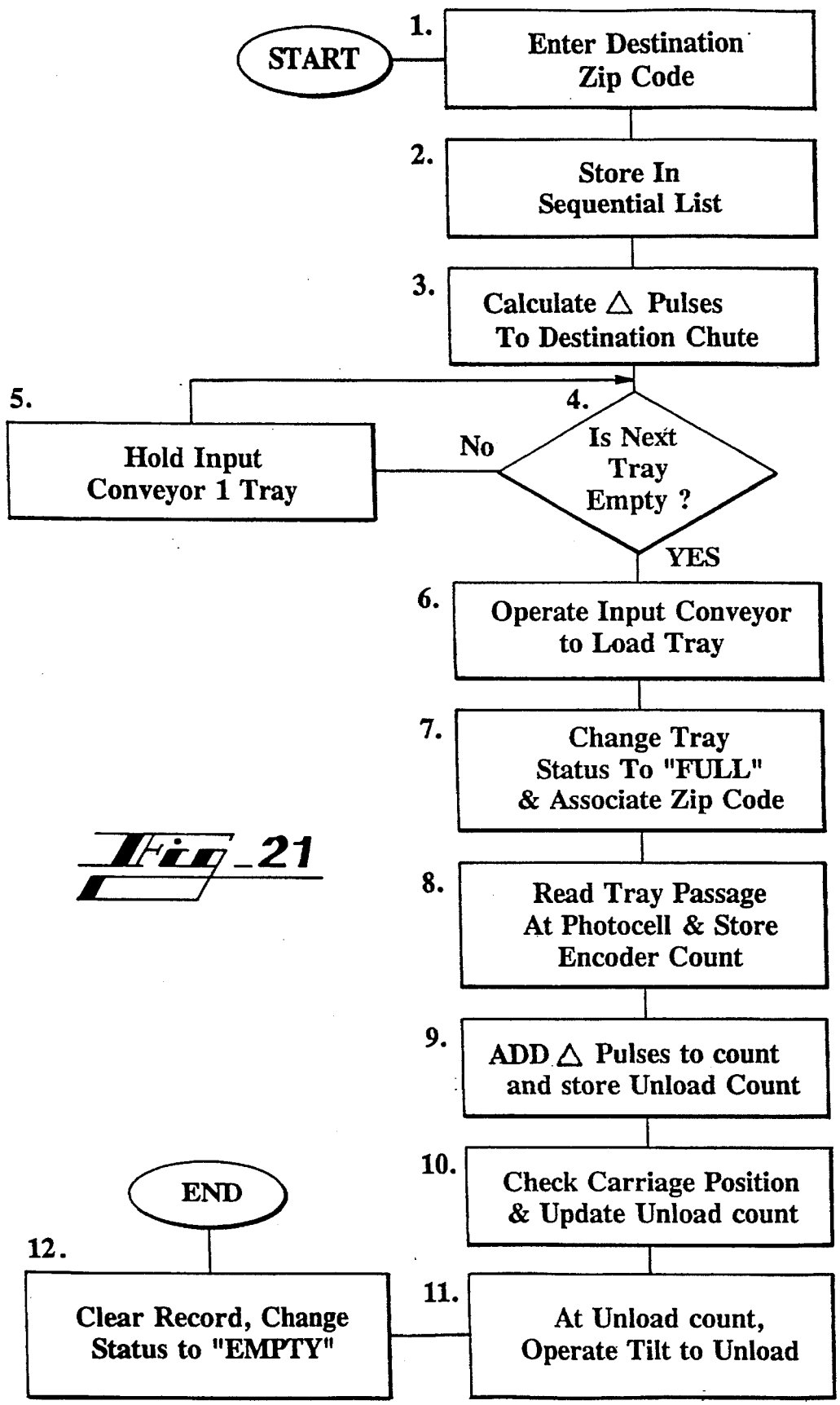
FIG. 21 is a flow chart outlining operation of the sorting system under control of a digital controller.

Referring now in more detail to the drawing, in which like numerals refer to like parts throughout the several views, FIG. 1 shows an automatic sorting system 10 embodying the present invention. With reference to FIGS. 1 and 2, the sorting system 10 includes a monorail 12 and a line or train of carriages 14 mounted for travel along the monorail 12. In the preferred form shown, the monorail forms a closed loop, and the carriages fill the monorail. Thus, the carriages 14 may be driven along the monorail in one direction by a drive mechanism 16, to be described in detail below. The carriages 14 travel through an input section 18 at which they are loaded with items, such as parcels to be delivered to addressee destinations, and then through output sections 20. At the output sections 20, the items are removed from the carriages by tilting mechanisms 22 which remove the items at an output chute corresponding to the item's destination, in a manner described below.

Other subassemblies of the sorting system 10 shown in FIG. 1 include a return mechanism 24, which prepares the carriages to receive new items as they return to the input section 18, and a carriage tracking station 26 which positively locates a carriage carrying a particular item so that a controller (not shown) including a digital processor may cause the item to be sorted to the correct destination. The subassemblies thus far noted and shown diagrammatically in FIG. 1 will now be described in detail.

Referring now to FIG. 3, the monorail 12 is supported by a plurality of support posts 30. A suspending bracket 32 extends from each post 30 and is attached, such as by welding, to the monorail 12, to hold the monorail 12 in a position spaced horizontally from the posts 30. In the preferred embodiment shown, the monorail 12 consists of a square steel extrusion held by the brackets 32 in a diamond configuration, that is, with opposing corners of the square cross section aligned vertically. Other metals or suitably strong materials may be utilized, and the beam may be hollow as shown or solid. An alternate embodiment of a monorail 34, designed for greater stability, is shown in FIG. 16. In this embodiment, a rectangular box beam 35 is attached to the posts 30 by a flanged support bracket 38. L-shaped extrusions or angle irons 36 are welded to the top and bottom surfaces of the box beam 35. Thus, the modified monorail 34 is an extended version of the square monorail 12.

A removable section 40 of the monorail 12 is shown in FIGS. 14 and 15. A pair of special suspending brackets 42 am attached to the ends of the removable section 40 and the main monorail 12. Both of the brackets 42 are bolted to a slotted bracket 43 which is attached to the post 30. The brackets 42 slide into a slot 44 formed in the bracket 43, and are held in place by bolts 45 which pass through mating holes in the brackets 42 and 43. By removing the bolt 45 which attaches the removable section to the post 30, the removable section 40 can be slid out of the slot 44 in order to remove and replace carriages on the monorail 12. This procedure reduces down time in repairing carriages, since a carriage can be removed and replaced without any disassembly of the carriage itself.

Returning to FIGS. 2 and 3, the train 14 of carriages is formed of a plurality of lower level carriages 50 and a plurality of upper level carriages 51. Both types of carriages 50 and 51 have a frame 52 in the shape of an elongate "C", which wraps around the monorail with the open side of the "C" facing the posts 30 and receiving the monorail 12 and support brackets 32. The frame 52 may be constructed of bent steel or another metal such as aluminum, or formed of any suitably strong material. Four axle bolts 54, shown in FIGS. 3 and 4, extend across the frame 52, two axles on either side of the monorail 12. Four grooved rollers 55 are rotatably mounted on the axles 54 so as to engage the upper and lower sides of the monorail 12 with the corners of the monorail being received in the grooves of the rollers. The rollers 55 are provided with ball bearings (not shown) and preferably are made of urethane for noise reduction, but can be constructed of metal. Spacers 57 on either side of the rollers center the rollers within the frame 52. The axles and rollers are positioned so that the rollers snugly fit onto the monorail 12 in a manner which permits free rotation of the rollers and smooth travel of the carriage along the monorail 12, without excess vibration.

The train 14 of carriages 50 and 51 preferably alternates upper and lower level carriages and completely fills the looped monorail 12 with carriages. In such a configuration, it is not necessary to physically connect the carriages to one another. Rather, a bumper 58, as shown in FIG. 4, may be fixed to one end of each carriage to cushion its contact with the adjacent carriage. If the monorail is not completely filled by an even or odd number of carriages, the extra space can be filled by a large bumper on one of the carriages or by a filler carriage having a special length. In an alternate embodiment, described below, the carriages are resiliently attached to one another. Furthermore, it should be understood that many advantages of the present invention can be incorporated in a monorail system which is not a closed loop. Also, the carriages might move in reversible directions, or the monorail could change elevation along its course or follow a serpentine path.

The lower level carriages 50 and upper level carriages 51 include many common structural characteristics. A lower level carriage 50 will be described first, and the differences in the upper level carriage 51 will be noted. Each lower level carriage 50 includes a tilting tray or platform 60 pivotally mounted to the frame 52 for tilting about a longitudinal axis, that is, an axis along the monorail 12. The tray 60 preferably is made of fiberglass but may be constructed of metal, plastic, or wood. The tray is preferably rectangular and longitudinally concave toward its center to cause automatic centering of parcels as they are loaded onto the tray.

A pair of pivot brackets 62 extend downwardly from the bottom of the tilting tray 60 and are attached by pivot pins 65 to a corresponding pair of pivot brackets 63 extending upwardly from the top of the frame 52. The position of the tilting tray 60 is controlled by a detent mechanism 67, which includes a detent housing 68 projecting downwardly from the center of the tilting tray 60 between the pivot brackets 62. A downwardly opening cavity 62 in the detent housing 68 receives a spring-loaded square tube 70 which carries a cam follower 72 that is movable against the pressure of the spring 70. As best shown in FIG. 3, a tray alignment cam 74 is mounted to the top of the carriage frame 52 under the detent mechanism 67. The alignment cam 74 is shaped to have a central recess 76, an outer recess 77 separated from the central recess by a hump 78, and an inner recess 79 separated from the central recess by a hump 80.

The sides of each tilting tray 60 are bent down to define a pair of tray tilting cam surfaces 85 along the longitudinal side edges. The profile of the cam surfaces 85 is shown in FIGS. 6 and 7. The cam surfaces slope downwardly away from the leading end of the tray 60 (defined with respect to the direction of travel of the carriage) to a low point at the trailing end of the tray. When sufficient force is exerted on the side edges of the tray 60 via the cam surfaces 85 by the tray tilting mechanisms 22, the force of the spring 70 is overcome and the follower 72 crosses one of the humps 78 or 80. The force of the spring 70 then causes the tray to continue tilting until the follower 72 rests in the center of either the inner recess 79 or the outer recess 77 depending on which way the tray has been tilted.

If the monorail sorting system has a reversible direction drive, the tray tilting cam surface will have a profile 87 as shown in FIG. 8. As shown, the cam surfaces slope from both the leading and trailing ends of the tray 60 downwardly to a low point at the center of the tray.

Each upper level carriage 51 includes an upper level tilting tray 90 which is elevated above the frame 52 by a tray elevation post 92. The height of the upper trays 90 can be varied, but preferably is eighteen inches or more. A cross beam 93 attached to the elevation post 92 extends in a longitudinal direction and carries the pivot bracket 63 and the tray alignment cam 74, which have the same structure as provided for a lower level carriage 50. The upper level trays 90 also include cam surfaces 85 for tilting and a detent mechanism 67 identical to that provided for lower level carriages.

In the preferred embodiment, the upper level tilting trays 90 extend longitudinally over adjacent lower level trays 60. Also, the lower level trays 60 of every other carriage extend longitudinally over adjacent carriages, beneath the upper level trays 90. The preferred configuration of adjacent carriages and upper and lower level trays can be seen in FIGS. 2 and 4. This configuration has great advantages in that a greater density of items or parcels can be carried per unit length of monorail, reducing the square footage of floor space needed to house the monorail sorting system for a given desired rate of item handling. Furthermore, if the monorail must make tight turns, the carriages individually can be short, such as about one foot long, while the trays may be almost twice the length of the carriages. Preferably, about four inches clearance is left between adjacent trays to allow for support posts and angling on turns.

The drive mechanism 16 is best shown in FIGS. 2 and 3. It provides a simple and reliable way to move the carriages around the monorail without complex chains, belts or gears as used in prior sorting mechanisms. A drive roller 102, preferably an inflated tire about two feet in diameter, is rotatably mounted on a shaft (not shown) passing through a shaft carrier 103 below the carriage frames 52. The shaft carrier 103 is pivotally connected to one of the posts 30 about horizontal pivot pins 105 aligned with a pivot axis parallel to the monorail 12. The shaft carrier 103 then extends beyond the post 30 into a speed reducer 107 associated with an electric motor 108 for driving the shaft.

It will thus be seen that the drive connection between the drive mechanism 16 and the train 14 of carriages 50 and 51 is simply the frictional contact between the outer surface of the tire 102 and the lower surfaces of the carriages. Since the heavy motor 108 is cantilevered at the end of the shaft carrier 103 opposite the tire 102, the weight of the motor 108 urges the tire 102 against the carriage frame 52. The outer periphery of the tire 102 preferably consists of a high friction elastomeric material or tread.

The drive mechanism 16 can be mounted at any location around the monorail loop, and several identical assemblies may be used with one monorail loop in order to provide redundancy and to even out the propulsion forces. As shown in FIG. 4, the tire as it rotates engages one carriage after the other and propels the entire carriage train 14 forward at an appropriate speed, which may be about 300 fpm. In order to provide a reversible capability for the carriage train 14, it is only necessary to provide a reversible motor.

Referring now to FIG. 9, the input section 18 includes a lower input conveyor 112 and an upper input conveyor 113. The conveyors 112 and 113 are short metering conveyor assemblies that are intermittently operable under the control of the computer controller. A pair of stabilizing rails 115, one on each side of the monorail 12, extend just below each tilting tray 60 and 90. The rails 115 are supported by members (not shown) extending upwardly from the floor or from the posts 30. The conveyors 112 and 113 extend to a position closely adjacent to the outer side of the tilting trays, so that parcels 114 can be delivered onto the trays. The stabilizing rails 115 prevent the trays from tilting as a result of the impact and weight of the parcels 114. Thereafter, the detent mechanism 67 is sufficient to keep the tray horizontal until the tray is tilted to discharge a parcel. If desired, rollers or wheels positioned below the trays may be used to stabilize the trays during loading instead of the rails 115.

The carriage tracking station 26 is located immediately downstream of the input section 18. As shown in FIG. 2, a handshake photocell transmitter and detector 118 are positioned across the path of the carriages. The photocell 118 detects the passage of each carriage and provides an appropriate signal to the controller. A shaft encoder 120 includes a wheel which engages the bottom of the carriage frames 52 and provides an output signal corresponding to the distance traveled by the carriages along the monorail. The role of these components in tracking loaded carriages to the proper output chutes will be described in detail below.

Details of the tray tilting mechanisms 22 are shown in FIGS. 3 and 5. Each mechanism 22 consists of a two-position cam following assembly which may be mounted to engage one of the cam surfaces 85 of either the lower trays 60 or the upper trays 90. As shown in FIG. 3, a lower tilting cam follower 125 is rotatably mounted on a shaft 126 that is rigidly connected to a vertical arm 128. The arm 128 is suspended from above the monorail 12 on a pivot 129. A solenoid 130 has an extending plunger pivotally connected at 132 to the arm 128. A spring 133 normally draws the arm 128 and cam follower 125 into the retracted position shown in FIG. 3, whereas operation of the solenoid 130 rotates the cam follower 125 into an operative position as shown in FIG. 5, in the path of the cam surfaces 85. Alternately, it would be possible to employ a conventional solenoid of the type which is stable in both positions, eliminating the need for the spring 133.

Referring to FIG. 2, a tray tilting mechanism 22 positioned in the path of the lower tray 60 is shown along side such a mechanism suspended at a height in the path of the upper trays 90. The latter mechanism includes a shorter suspending arm 136 and a cam follower 135. Whether positioned to tilt upper or lower trays, the mechanisms 22 are constructed and operate in a similar manner. FIGS. 6 and 7 show the action of the cam follower 125 on the cam surface 85 as the tray 60 moves to the right. The side of the tray engaging the cam follower 125 is lifted by the pressure of the cam follower 125 on the cam surface 85. As noted above, this action tilts the tray until the follower 72 of the detent mechanism 67 leaves the central recess 7'6 of the tray alignment cam 74.

Details of the output sections 20 may be seen in FIGS. 2 and 10. Lower output chutes 140 and upper output chutes 141 are positioned along both sides of the monorail 12 and are aligned to receive parcels sliding off the trays 60 and 90, respectively, when such trays have been tilted by one of the tilting mechanisms 22. A tilting mechanism 22 is associated with each output chute 140 and 141. If a parcel 114 is destined for an output chute 141 on the inside of the monorail 12, the cam surface 85 on the outside of the monorail 12 will be engaged by a cam follower 135 just before the carriage holding the parcel reaches the output churn. The cam follower 135 will cause the detent mechanism 67 to jump into the outer recess 77 of the tray alignment cam, and the tray 90 will tilt to the inside of the monorail, into the position shown in FIG. 10. The tray tilts to enough of an angle (preferably about 15°) that the parcel 114 will slide off the tray onto the output chute 141 under the force of gravity. If the parcel is destined for one of the output chutes on the outside of the monorail, the tray is tilted so that the detent mechanism is moved to the inner recess 79 of the cam 74, tilting the tray to the outside in alignment with an output chum 140, as shown in connection with the lower tray 60 shown in FIG. 10.

As the carriages approach the input section 18, most or all of the trays 60 and 90 will have been tilted by the tray tilting mechanisms 22. In order to prepare the trays for the receipt of new parcels, the tray return mechanism 24, shown diagrammatically in FIG. 2, is positioned upstream of the input section 18. Four fixed tray return rollers 145 are mounted on fixed support arms 147 to position the rollers 145 in the path of the cam surfaces 85 of the trays 60 and 90 in all four possible tilted orientations of the trays. The rollers 145 act as cam followers in the manner shown in FIGS. 6 and 7, and cause the detent mechanisms to return to the central recess 76 of the tray alignment cam 74. This occurs before the trays pass over the stabilizing rails 115 described above. Alternatively, fixed ramps may be used for the tray return function in lieu of the rollers 145.

An optional linkage 150 for connecting adjacent carriages as shown in FIGS. 11-13. A roughly Z shaped bracket 152 is attached to the inner side of each carriage frame 52 at both ends of the carriage. The brackets are mounted to define a pocket opening toward the next adjacent carriage, and are aligned so that such openings face one another. An elastomeric bumper 154 is shaped to define two enlarged ends 155 and a central bumper protrusion 156 which extends outwardly between the ends 155. As shown in FIG. 13, the bumper 154 is slidably inserted under the brackets 152 of two adjacent carriages, so that the enlarged ends 155 are received in the facing pockets defined by the brackets 152. At the same time, the protrusion 156 is inserted between the ends of the carriage frames 52 to provide a bumper cushion between the carriages.

An example of the positioning of a linkage 150 is shown in FIG. 2. Since the bumper member 154 is formed from rubber or some other pliable material, and is positioned around the interior of the carriage train 114, the linkages 150 are able to flex as the carriages pass around curves of the monorail 12. This enables the carriages to be linked and cushioned from one another without the need for mechanical joints, hinges, or the like.

Second Embodiment

An alternate embodiment of the present invention is shown in FIGS. 17-20, which portray a suspended automatic sorting system 160. In contrast to the support post 30 of the first embodiment, downwardly extending posts 162 suspend the monorail 12 from a ceiling, or other overhead support structure. As shown in FIG. 18, the alternate drive mechanism includes a drive tire 165 mounted on a shaft carrier 166 which is pivotally connected at a pivot 168 associated with a suspending post 162. However, the drive tire 165 rests on the upper surface of the carriage frames 52, and a drive motor 170 is attached to the drive shaft carder 166 on the side of the drive tire 165 opposite to the post 162. Thus, the weight of the motor 170 presses the drive tire 165 down against the carriage frames 52.

The purpose of the suspended sorting system 160 is to carry large or irregular items on suspended tray assemblies 175 hanging below the carriages frames 52. Each carriage has a basic frame 52 and system of rollers 55 which surround and engage the monorail 12 in the same manner as described above in connection with the first embodiment. Each suspended tray assembly 175 includes a pair of suspending arms 177 which are L-shaped as shown in FIG. 18. The suspending arms 177 for a tray assembly 175 may be attached to carriage frames 52 which are separated by one or more filler carriages, in order to provide a carrying surface that is longer than a tray capable of being supported by a single carriage.

In the variation shown in FIG. 18, a platform 178 is supported by a pair of suspending arms 177. The vertical member of the suspending arms is attached at the inner, lower comer of carriage frame 52 by a spring-catch hinge 181. The hinge 181 is of a conventional construction which holds its position until rotated a short distance upwardly, after which it releases to rotate downwardly past its initial holding position. In this embodiment, the tray tilting mechanism includes a roller 182 which may be moved between a retracted position and an extended position in the path of the platforms 178, by a mechanism similar to that used to operate the cam follower 125 in the first embodiment. Alternately, the roller 182 could be movable from a retracted position directly below the path of the carriages. The platform 178 may be provided with a bevelled leading edge 179 for initial engagement by the roller 182. The roller 182 is positioned so that it lifts the platform 178 a short distance to disengage the spring-catch hinge 181 as the platform "climbs" the roller. After the platform 178 clears the roller 182, the weight of the platform and an item 184 on the platform moves the platform downwardly into a position shown in phantom lines in FIG. 18. This lower position is in alignment with an output chute 140 which guides the item 184 to its destination.

Another variation of the suspended tray assembly is shown in FIG. 19. Here, suspending arms 185 are rigidly attached to the inner surface of the carriage frames 52, and the platform 178 is provided with conventional motorized rollers 186 to provide a conveyor bed. The motorized rollers 186 are energized as the platform 178 is aligned with the correct output chute 140 to transport the item 184 off of the platform 178 onto the chute 140. This energization is accomplished by providing a pair of sweep contacts 190 on either the suspending arms 185, the platform 178, or the carriage frame 52. The contacts 190 are wired (not shown) to the motorized rollers 186. A pair of mating supply contacts 192 is mounted on support structure (not shown) in the path of the sweep contacts 190. A set of the supply contacts 192 may be associated with each output chute 140. The computer controller selectively provides power to the correct set of contacts when a platform 178 carrying an item destined for the output chute 140 approaches. Or, the supply contacts may be mounted to be movable into the path of the sweep contacts when a particular platform 178 is approaching the output chute 140 onto which the item on the platform is to be unloaded. A solenoid actuating system of the type shown in connection with the tilting mechanisms 22 of the first embodiment could be used to move the supply contacts 192. Typically, a 12 or 24 volt power supply is required for the motorized rollers 186.

A third variation of the suspended tray assembly is shown in FIG. 20, in which the motorized roller bed 186 of FIG. 19 has been replaced by a motorized conveyor belt 195 having drive rollers at either end. Operation of the conveyor belt to unload items from a platform 178 may be accomplished using contacts 190 and 192 as described above.

By extending the suspended tray assembly 175 below three or more carriages, it may be made long enough to carry large, bulky and irregular items. For example, the tray may be three to four feet long and 18 inches wide. The length depends on the number and size of the filler carriages positioned between the carriages which support the suspending arms. The suspended tray assembly 175 is also more practical for carrying heavy loads because such loads are easier to hang than to support on a platform from below.

Operation

The automatic sorting system 10 or 160 is operated under the control of a digital controller, which may be a programmed logic controller (PLC) or a general purpose microprocessor such as found in a personal computer. Methods for programming such controllers to operate a sorting system of the type disclosed herein are conventional and known to those skilled in the art. A flow chart of the general logic to be programmed into the controller is shown in FIG. 21.

The number of carriages and an identification code for each carriage are input into the controller memory, along with the identification of the carriage that is initially aligned with each input conveyor when movement of the carriage train begins. After the carriage train 14 starts, it moves continuously along the monorail 12. An operator places the packages 114 in single file order on one of the input conveyors 112 or 113. The operator then reads the label on each package and enters the destination zip code into the controller memory, as noted at Block 1 of the flow chart, using either a keypad or a voice recognition input device. As the carriage train 14 moves around the monorail 12, the shaft encoder 120 provides a signal representing its count to the controller, which is then able to determine at any given time the location of the carriages.

At Block 2 the zip code entered at Block 1 is stored in a sequential list. At Block 3, the controller calculates the number of encoder pulses that will occur between the location of the photocell 18 and the destination output chute 140 or 141 that is associated with the entered zip code. At Block 4, the controller checks its memory to determine whether the status of the next tray approaching the input conveyor is "empty" or "full." If the next tray is not empty, the controller holds operation of the input conveyor until it has an opportunity to check the next tray. If the approaching tray is empty, in Block 6 a signal is sent to operate the input conveyor to load the tray. The input conveyors are configured to operate rapidly and intermittently on command from the controller, which starts operation of the input conveyor shortly prior to the time at which the continuously moving carriage becomes aligned with the input conveyor. As the parcel 114 moves onto the tilting tray 60 or 90, the concave shape of the tray helps to center the parcel in a stable position.

Upon commanding operation of the input conveyor, the controller also changes the status of the particular tray to "full" in memory and associates the next zip code in the sequential list with the particular tray (Block 7). If desired, a photocell or other sensor can be placed between the input conveyor and the carriages to determine whether in fact a parcel has been delivered to the tray upon operation of the input conveyor. As the now-loaded carriage continues to move, its passage is detected by the photocell 118, which is located just downstream of the input conveyor, as noted in Block 8 of the flow chart. The photocell provides a signal corresponding to the encoder count at the time the carriage passes to the controller, where the count is stored. At Block 9, the previously calculated number of pulses between the photocell and the destination output chute are added to the current encoder count to provide the count that will be reached when it is necessary to unload the parcel. This value is stored in association with the particular tray.

In order to account for any drifting of the carriages as they travel around the monorail 12, one or more additional photocell detectors 121 may be provided along the monorail path. At Block 10, the output signal from an additional photocell is checked to determine whether the carriage in question passes the additional photocell at precisely the encoder count corresponding to the position at which the carriage should be found. If there is a variation from the predicted count, the stored unload count associated with the carriage is updated to reflect the change. If the lack of correspondence is greater than a predetermined threshold, the carriage may be rerouted to an unsorted output chute for resorting.

At Block 11, the controller, upon receiving the unload count from the shaft encoder, sends a signal to operate the tilting mechanism 22 associated with the output chute assigned the destination zip code. Tilting begins shortly before complete alignment of the tray 60 or 90 with the output chute 140 or 141, so that movement is imparted to the parcel 114 at the proper time for the parcel to slide off the tray onto the output chute. Any number of trays can be tilted simultaneously depending on when they reach the location of the unload count. At this time, as noted in Block 12, the memory record associated with the tray may be cleared of values associated with the sorted parcel and the tray status changed to "empty."

As noted above, the trays remain tilted until the trays pass through the tray return mechanisms 24, which returns the trays to their horizontal position without intervention by the controller. The process outlined in FIG. 21 is repeated when the tray returns to the input section 18.

It is possible to operate the system with multiple input conveyors, with each of the input conveyors having a photocell detector 118 associated with it to signal the location of a carriage that has just received a parcel from the input conveyor. This permits the unload count for the carriage to be determined. It would be possible to alter the programmed logic to cause input conveyors positioned upstream of other input conveyors to skip empty carriages in a coordinated fashion to allow all of the input conveyors to continue loading their parcels. Of course, upper and lower input conveyors 113 and 112 can operate virtually simultaneously.

From the foregoing description, it will be seen that an automatic sorting system embodying the present invention provides a high throughput of parcels to be sorted, using a system that is simple in construction, is easy to maintain and keep on line, and occupies a relatively small amount of space. The system also operates at low noise levels. In particular, the efficiency of the system is improved by the use of a multi-level tray system associated with carriages running along one track. The novel drive mechanism moves the carriages in a reliable manner without the need for complex belt or chain drives. Furthermore, the carriages may optionally be linked by the low-noise, pliable linkage assembly described above.

While the present invention in its various aspects has been described in detail with regard to preferred embodiments thereof, it should be understood that variations, modifications and enhancements can be made to the disclosed apparatus and procedures without departing from the spirit and scope of the present invention as defined in the appended claims.

What is claimed is:

1. An apparatus for transporting objects, comprising:

a track;

a plurality of carriages mounted for movement along said track;

a linkage connecting adjacent carriages, said linkage comprising:

a bracket attached to each of said adjacent carriages, shaped to define a pocket; and a link member comprising:

a pair of ends positioned in said pockets;

an elongate member extending between said ends and configured, when in an extended position, to limit the amount of separation between said adjacent carriages; and a cushioning member attached to said elongate member and adapted to extend between end surfaces of said carriages when said elongate member is in said extended position; and a drive mechanism operable to cause said carriages to move along said track.

2. The apparatus of claim 1, wherein said track defines at least one curve therein, and said carriages define an inner side surface which travels along the concave portion of the curve, and said brackets are positioned on said inner side surfaces of said carriages.

3. The apparatus of claim 2, wherein said pockets include an opening facing an adjacent carriage, and said link member ends are larger than said pocket openings.

4. The apparatus of claim 1, wherein said link member comprises a pliable material.

5. An apparatus for transporting objects, comprising:

a track having at least one curve;

a plurality of carriages mounted for movement along said track;

a linkage connecting adjacent carriages, said linkage comprising a pliable, deformable member attached to each of said adjacent carriages and including an elongate member extending between said adjacent carriages and a cushioning member extending from said elongate member, said elongate member working to connect adjacent carriages and said cushioning member extending between end surfaces of said carriages and working to cushion said adjacent carriages and said linkage working to allow flexing when said carriages move around said curve; and a drive mechanism operable to cause said carriages to move along said track.

6. The apparatus of claim 5, wherein said linkage further comprises:

a bracket attached to each of said adjacent carriages, shaped to define a pocket; and a link member defining a pair of ends positioned in said pockets.

7. The apparatus of claim 6, wherein said track defines at least one curve therein, and said carriages define an inner side surface which travels along the concave portion of the curve, and said brackets are positioned on said inner side surfaces of said carriages.

8. The apparatus of claim 7, wherein said pockets include an opening facing an adjacent carriage, and said link member ends are larger than said pocket openings.

9. The apparatus of claim 6, wherein each of said brackets includes an opening along one side, and wherein said member is adapted to slide into said openings.

10. An apparatus for transporting objects, comprising:

a track having at least one curve therein;

a plurality of carriages mounted for movement along said track, the carriages defining an inner side surface which travels along the concave portion of the curve;

a linkage connecting adjacent carriages, said linkage comprising:

a bracket attached to the inner side surface of each of said adjacent carriages, shaped to define a pocket; and a link member defining a pair of ends positioned in said pockets; and a drive mechanism operable to cause said carriages to move along said track.

* * * * *